United States Patent
Chen et al.

(10) Patent No.: US 10,831,309 B2
(45) Date of Patent: Nov. 10, 2020

(54) TOUCH SENSING METHOD FOR A DISPLAY WITH TOUCH DEVICE

(71) Applicant: ELAN MICROELECTRONICS CORPORATION, Hsinchu (TW)

(72) Inventors: Jyun-Yu Chen, New Taipei (TW); Kun-Lin Hsieh, Pitou Township, Changhua County (TW)

(73) Assignee: ELAN MICROELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 16/212,474

(22) Filed: Dec. 6, 2018

(65) Prior Publication Data

US 2019/0369795 A1    Dec. 5, 2019

(30) Foreign Application Priority Data

Jun. 1, 2018 (TW) .............................. 107118950 A (51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01)

(58) Field of Classification Search
None
See application file for complete search history.

(56) References Cited

U.S. PATENT DOCUMENTS

| | | | |
|---|---|---|---|
| 8,542,221 B1* | 9/2013 | Wyatt ..................... | G06F 15/00 345/204 |
| 9,916,035 B2* | 3/2018 | Kim ..................... | G02F 1/13338 |
| 10,347,173 B2* | 7/2019 | Lee ....................... | G09G 3/3266 |
| 10,359,885 B2* | 7/2019 | Brahma ................. | G06F 3/044 |
| 10,754,473 B2* | 8/2020 | Teranishi ............. | G09G 3/3611 |
| 2014/0062898 A1* | 3/2014 | Singh .................... | G06F 1/3262 345/173 |
| 2014/0071062 A1* | 3/2014 | Fang ..................... | G06F 3/0416 345/173 |
| 2014/0354553 A1* | 12/2014 | Dai ....................... | G06F 3/0416 345/173 |
| 2015/0002453 A1 | 1/2015 | Lu et al. | |
| 2015/0153845 A1* | 6/2015 | Chang ................. | G06F 3/03545 345/179 |
| 2015/0302829 A1* | 10/2015 | Shepelev ................ | G06F 3/044 345/174 |
| 2016/0078832 A1* | 3/2016 | Ota ...................... | G09G 3/3655 345/212 |

(Continued)

FOREIGN PATENT DOCUMENTS

TW    201308158 A1    2/2013
TW    201702816 A    1/2017

*Primary Examiner* — Dorothy Harris
(74) *Attorney, Agent, or Firm* — Patenttm.us (57) ABSTRACT

A touch sensing method for a display with touch device having an image display period, which includes multiple execution time sections. Each execution time section has a display time division and a blank time division. A display procedure is executed in each display time division. A communicating procedure is executed in one of the blank time division. In the communicating procedure, an uplink signal is provided by the common electrodes for a first object to receive. Thus, the display with touch device has more time to detect more different kinds of touch objects.

20 Claims, 10 Drawing Sheets

(56) References Cited

U.S. PATENT DOCUMENTS

| | | | |
|---|---|---|---|
| 2016/0116997 A1 | 4/2016 | Kim et al. | |
| 2017/0031465 A1* | 2/2017 | Jung | G06F 3/0383 |
| 2017/0192534 A1* | 7/2017 | Han | G06F 3/0383 |
| 2017/0285771 A1* | 10/2017 | Jung | G06F 3/03545 |
| 2018/0024654 A1* | 1/2018 | Koike | G06F 3/03 345/174 |
| 2018/0120962 A1* | 5/2018 | Hara | G06F 3/044 |
| 2018/0164909 A1* | 6/2018 | Bae | G06F 3/03545 |
| 2018/0260077 A1* | 9/2018 | Westhues | G06F 3/0418 |
| 2019/0004649 A1* | 1/2019 | Ju | G06F 3/044 |

* cited by examiner

TOUCH SENSING METHOD FOR A DISPLAY WITH TOUCH DEVICE

CROSS-REFERENCE TO RELATED APPLICATIONS

This application is based upon and claims priority under 35 U.S.C. 119 from Taiwan Patent Application No. 107118950 filed on Jun. 1, 2018, which is hereby specifically incorporated herein by this reference thereto.

BACKGROUND OF THE INVENTION

1. Field of the Invention

The present invention relates to a touch sensing method for a display with touch device, especially to a display with touch device that utilizes the horizontal blanking interval to proceed the touch sensing procedure.

2. Description of the Prior Arts

The in-cell touch display device utilizes the common electrode layer of the original display panel as touch sensing electrode layer so that a time-division method for display driving and touch scanning are mostly used. The time-division method for display driving and touch scanning divides each image display driving period into a display time period and a touch time period, wherein taking the display frequency as 60 Hz for example, the image display drive period is 16.67 ms. The touch time period corresponds to a vertical blanking interval (VBI) of the display panel so that the touch scanning does not influence the image quality displaying on the touch display device. During the display time period, the common electrode layer is used for displaying. During the touch scanning time period, the common electrode layer is used as driving and sensing electrodes for touch sensing. However, the VBI time is limited and is not enough for sensing the different kind of touch objects via multi-time divisions such as active stylus, inactive stylus, finger and so on.

To overcome the shortcomings, the present invention provides a touch sensing method for a display with touch device to mitigate or to obviate the aforementioned problems.

SUMMARY OF THE INVENTION

The present invention provides a touch sensing method for a display with touch device having multiple common electrodes and an image display period including an executing time section, wherein the executing time section includes a plurality of actuating time segments, each of the actuating time segments comprises a display time division and a blank time division, and the actuating time segments comprise a first actuating time segment and multiple second actuating time segments, and the method comprising a step of:

executing a communicating procedure in the blank time division of the first actuating time segment, wherein the common electrodes output an uplink signal in the communicating procedure.

In another aspect, the present invention provides a control method of an input device for a display with touch device having multiple common electrodes and an image display period including an executing time section, wherein the executing time section includes multiple actuating time segments, and each actuating time segment includes a display time division and a blank time division, and the method comprises steps of:

receiving an uplink signal by an input device, which is sent from the common electrodes, in the blank time division of at least one of the actuating time segments;

outputting a downlink signal from the input device, which is sent to the common electrodes, in the blank time divisions of the rest of the actuating time segments to obtain a touch information of the input device for the display with touch device.

The advantages of the present invention is to use the blank time division in the actuating time segment to provide an uplink signal for the first object to receive so that the display with touch device has more sufficient time to detect various touch objects.

Other objectives, advantages and novel features of the invention will become more apparent from the following detailed description when taken in conjunction with the accompanying drawings.

DETAILED DESCRIPTION OF THE EMBODIMENTS

Figure 1:
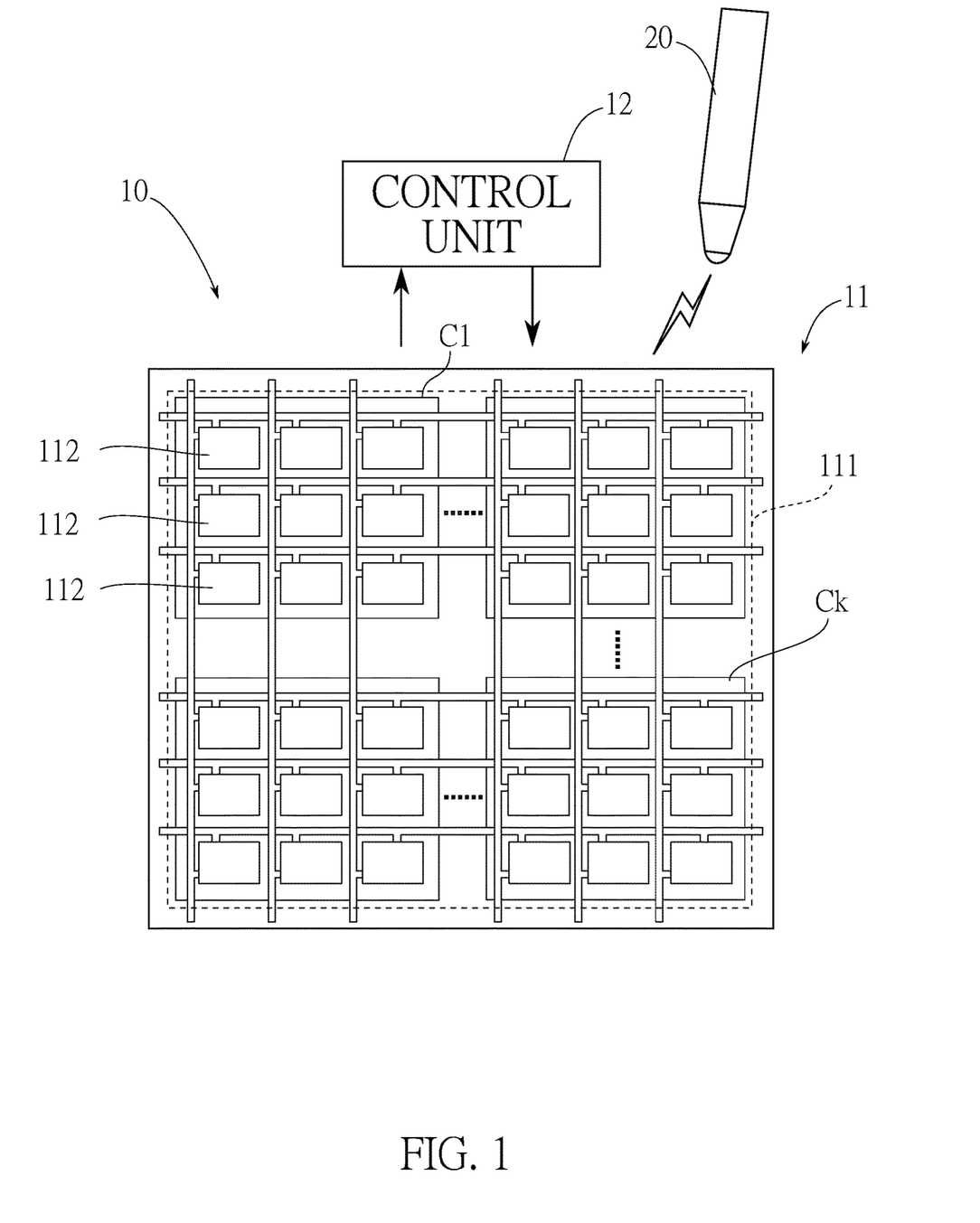
FIG. 1 is a illustrative view of a display with touch device implemented by a touch sensing method in accordance with the present invention.
Figure 2:
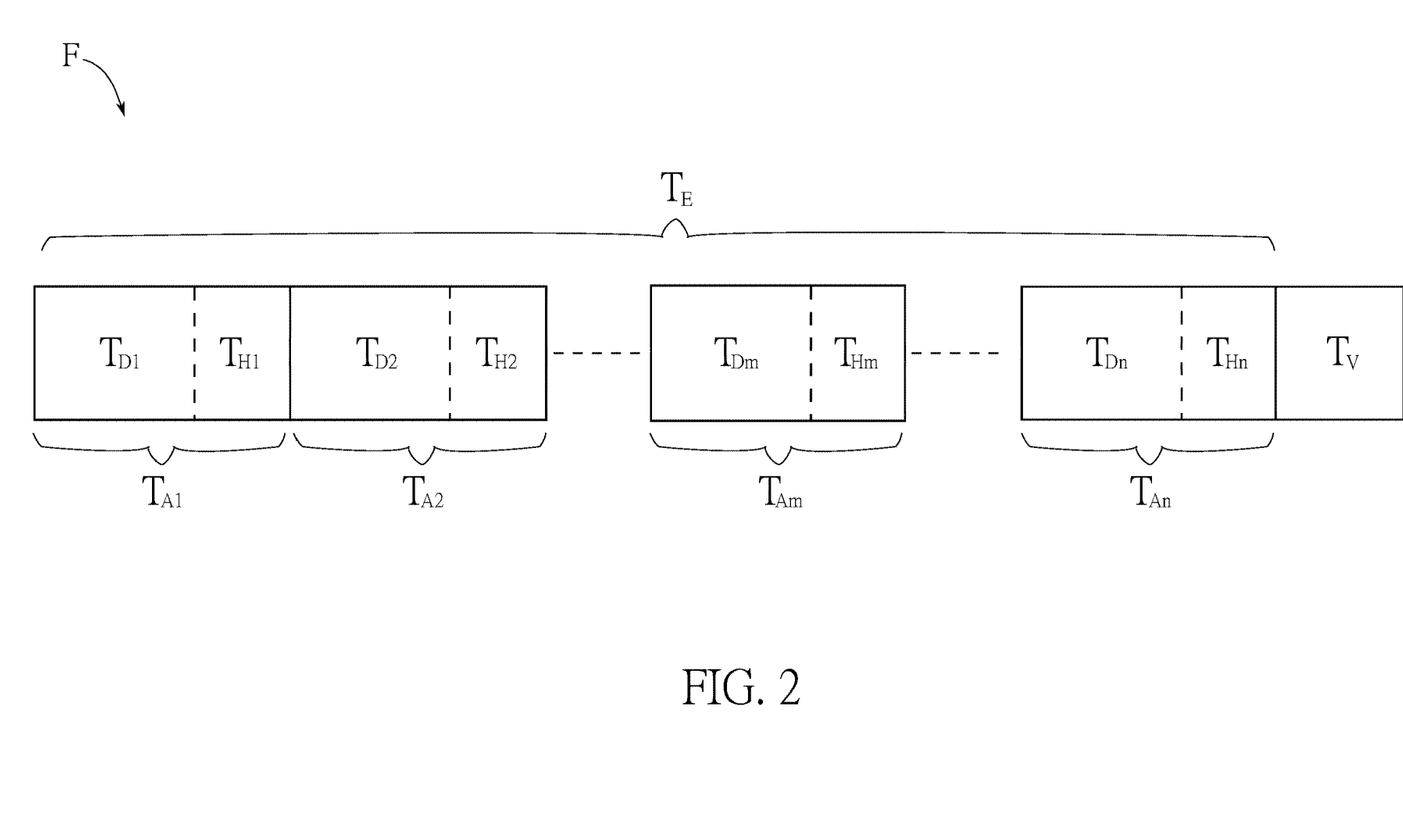
FIG. 2 is a time period chart of a first example as implementing a touch sensing method in accordance with the present invention.

With reference to FIGS. 1 and 2, a display with touch device 10 implemented by a touch sensing method in accordance with the present invention comprises a display panel 11 and a control unit 12. The control unit 12 electrically connects to the display panel 11 to control the display panel 11 to display the images or to sense the touch. The display panel 11 comprises multiple thin film transistors (not shown), a common electrode layer 111 and multiple pixel electrodes 112. In one embodiment, the common electrode layer 111 comprises multiple common electrodes $C_1$ to $C_k$ arranged in a matrix. Each common electrode $C_1$ to $C_k$ corresponds to h pixel electrodes, wherein h is a positive integer and greater than 1. For convenience, the following description takes one common electrode corresponding to nine pixel electrodes as an example, i.e. h=9. However, the amount of the pixel electrodes corresponding to each common electrode is determined based on the desired display resolution of the actual display panel 11 and the size of the common electrodes of the required touch resolution. In one embodiment, the size of each common electrode is equal to or similar to the size of the sensing electrode of a touch panel. When the display with touch device 10 displays the images, the gates of the thin film transistors on the corresponding areas are turned on to output the display signals to the corresponding pixel electrodes 112. Thus, the gray scales or colors of the corresponding pixel electrodes 112 connected by the turned-on gates of the thin film transistors are determined to display the images.

With reference to FIGS. 2 and 1, the following description recites an example of a touch sensing method in accordance with the present invention proceeding on the display with touch device 10. One image display period F includes an executing time section $T_E$ and an idle time section $T_V$. The executing time section $T_E$ includes n actuating time segments $T_{A1}, T_{A2} \ldots T_{Am} \ldots T_{An}$. Each actuating time segment $T_{A1}, T_{A2} \ldots T_{Am} \ldots T_{An}$ includes a display time division $T_{D1}, T_{D2} \ldots T_{Dm} \ldots T_{Dn}$ and a blank time division $T_{H1}, T_{H2} \ldots T_{Hm} \ldots T_{Hn}$. In each display time division $T_{D1}, T_{D2} \ldots T_{Dm} \ldots T_{Dn}$, a display procedure is executed. In the display procedure, the pixel electrodes and the corresponding common electrodes 112 display the images. Then and m are positive integers and m is smaller or equal to n. The control unit 12 executes a communicating procedure in at least one of the blank time divisions $T_{H1}, T_{H2} \ldots T_{Hm} \ldots T_{Hn}$. In the communicating procedure, the corresponding common electrode 112 outputs an uplink signal to a first object 20. In one embodiment, the first object 20 is an input device for a display with touch device 10 such as an active stylus, which receives the uplink signal from the display with touch device 10 and outputs a downlink signal to the display with touch device 10. The uplink signal may include matching information related to the first object 20, such as identification information, synchronization information, and encoded information. Further, the uplink signal may also include the lengths of time of each display time division $T_{D1}, T_{D2} \ldots T_{Dm} \ldots T_{Dn}$ and each blank time division $T_{H1}, T_{H2} \ldots T_{Hm} \ldots T_{Hn}$. In addition, the lengths of time of each display time division $T_{D1}, T_{D2} \ldots T_{Dm} \ldots T_{Dn}$ and each blank time division $T_{H1}, T_{H2} \ldots T_{Hm} \ldots T_{Hn}$ may be varied and pre-stored as a plurality of data sheets in the display with touch device 10 and the first object 20. In one embodiment, the uplink signal includes a selection information of one of said data sheets. When the communicating procedure is executed in the at least one of the blank time divisions $T_{H1}, T_{H2} \ldots T_{Hm} \ldots T_{Hn}$, the control unit 12 executes a first touch sensing procedure or a second touch sensing procedure in the rest of the blank time divisions $T_{H1}, T_{H2} \ldots T_{Hm} \ldots T_{Hn}$. In the first touch sensing procedure, the corresponding common electrodes 112 receive the downlink signal from the first object 20. Due to the capacitance changes of the corresponding common electrodes 112, the control unit 12 determines whether the first object 20 is detected and obtains the touch information of the first object 20. In the second touch sensing procedure, a driving signal is output to the corresponding common electrodes 112 and the control unit 12 determines whether a second object touches the display with touch device 10 via the capacitance changes of the corresponding common electrodes 112. In one embodiment, the second object may be a finger, an inactive stylus or a conductor. In the idle time section $T_V$, the first touch sensing procedure, the second touch sensing procedure or a test procedure may be executed. In the test procedure, the corresponding common electrodes 112 sense the influences of the noise, wherein the noise is a liquid crystal module (LCM) noise.

Various embodiments are recited as following to demonstrate the aforementioned example but do not limit the scope of the present invention.

First Embodiment

With reference to FIGS. 1 and 2, in the blank time divisions $T_{H1}, T_{H2} \ldots T_{Hm} \ldots T_{Hn}$ of one of the actuating time segments $T_{A1}, T_{A2} \ldots T_{Am} \ldots T_{An}$, the communicating procedure is executed, while the first touch sensing procedure is executed in the blank time divisions $T_{H1}, T_{H2} \ldots T_{Hm} \ldots T_{Hn}$ of the rest of the actuating time segments $T_{A1}, T_{A2} \ldots T_{Am} \ldots T_{An}$. When the first object 20 is detected, the first object 20 receives the uplink signal output by the corresponding common electrodes 112 of the display with touch device 10 in the communicating procedure. Then the first object 20 outputs the downlink signal to the corresponding common electrodes 112 in the following first touch sensing procedure. Via the capacitance change of the corresponding common electrodes 112, the touch information of the first object 20 is obtained. In one embodiment, if amount of the data of the uplink signal is large, the communicating procedure may be completed in multiple blank time divisions $T_{H1}, T_{H2} \ldots T_{Hm} \ldots T_{Hn}$ of the actuating time segments $T_{A1}, T_{A2} \ldots T_{Am} \ldots T_{An}$. In addition, in the idle time section $T_V$, the first touch sensing procedure, the second touch sensing procedure or a test procedure may be executed.

Second Embodiment

Figure 3:
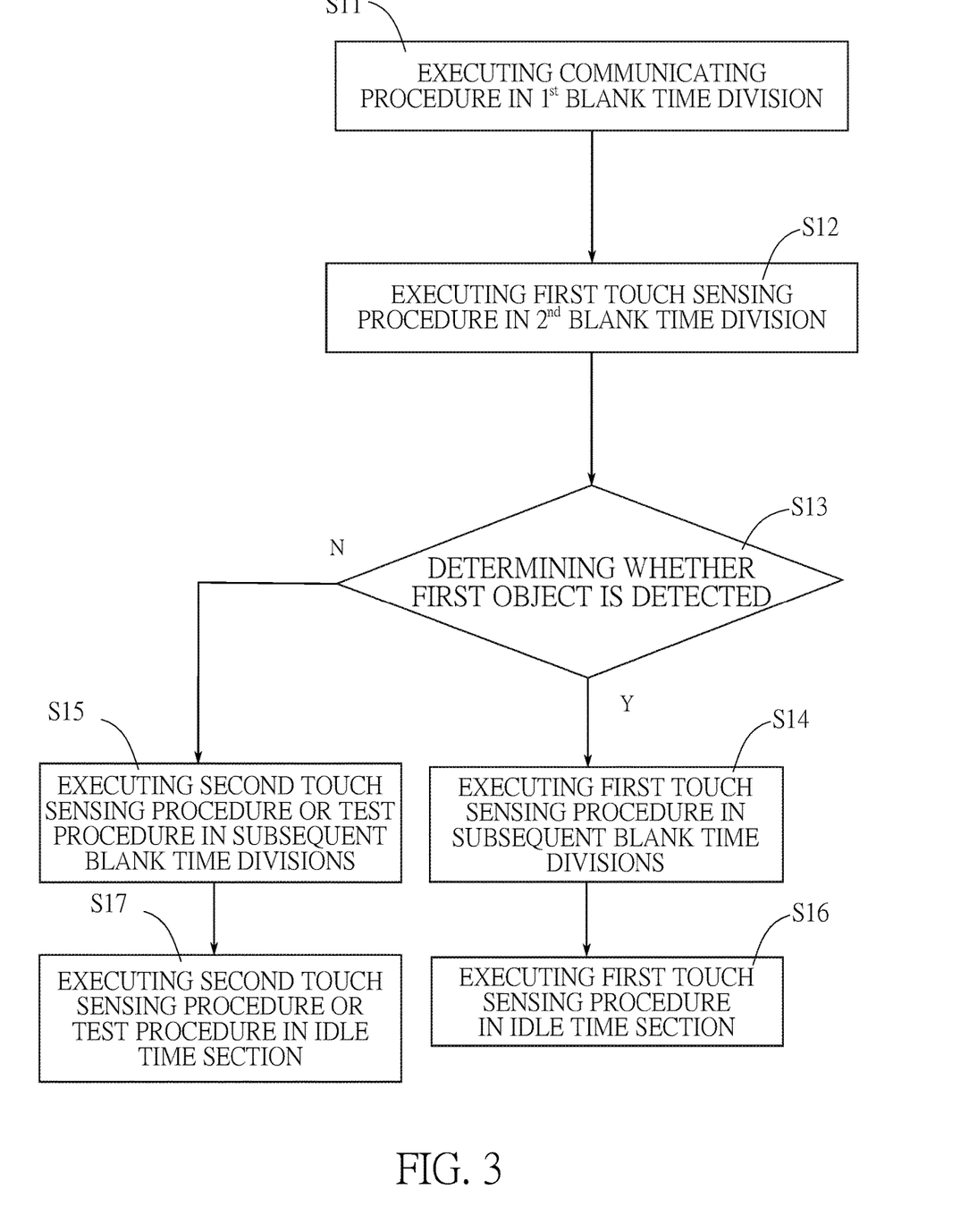
FIG. 3 is a flow chart of a first embodiment of a touch sensing method in accordance with the present invention.

With reference to FIGS. 3 and 2, the communicating procedure is executed in the $1^{st}$ blank time division $T_{H1}$ (S11). The first touch sensing procedure is executed in the $2^{nd}$ blank time division $T_{H2}$ (S12). In one embodiment, the step S11 is to execute the communicating procedure in the $1^{st}$ to $i^{th}$ blank time divisions $T_{H1} \ldots T_{Hi}$. In another embodiment, the step S12 is to execute the first touch sensing procedure in the $2^{nd}$ to $j^{th}$ blank time divisions $T_{H2} \ldots T_{Hj}$. Based on the data retrieved in the first touch sensing procedure, whether a first object 20 is detected is determined (S13). When the first object 20 is detected, the first touch sensing procedure is executed continuously in the subsequent blank time divisions $T_{H3} \ldots T_{Hn}$ to keep receiving the downlink signal from the first object 20 (S14). When no first object 20 is detected, the second touch sensing procedure or the test procedure is executed in the subsequent blank time divisions $T_{H3} \ldots T_{Hn}$ (S15) to detect whether the second object touches the display panel 11 or noise is occurred. The i and j are positive integers. The i is smaller than or equal to n and the j is smaller than n.

Moreover, when the first object 20 is detected, the first touch sensing procedure is executed in the idle time section $T_V$ (S16). When no first object 20 is detected, the second sensing procedure or the test procedure is executed in the idle time section $T_V$ (S17). In another embodiment, even if the first object 20 is detected, the uplink signal may include to request the first object 20 not to output the downlink signal in the idle time section $T_V$. Then in the idle time section $T_V$, the second sensing procedure or the test procedure is still executed.

Third Embodiment

Figure 4:
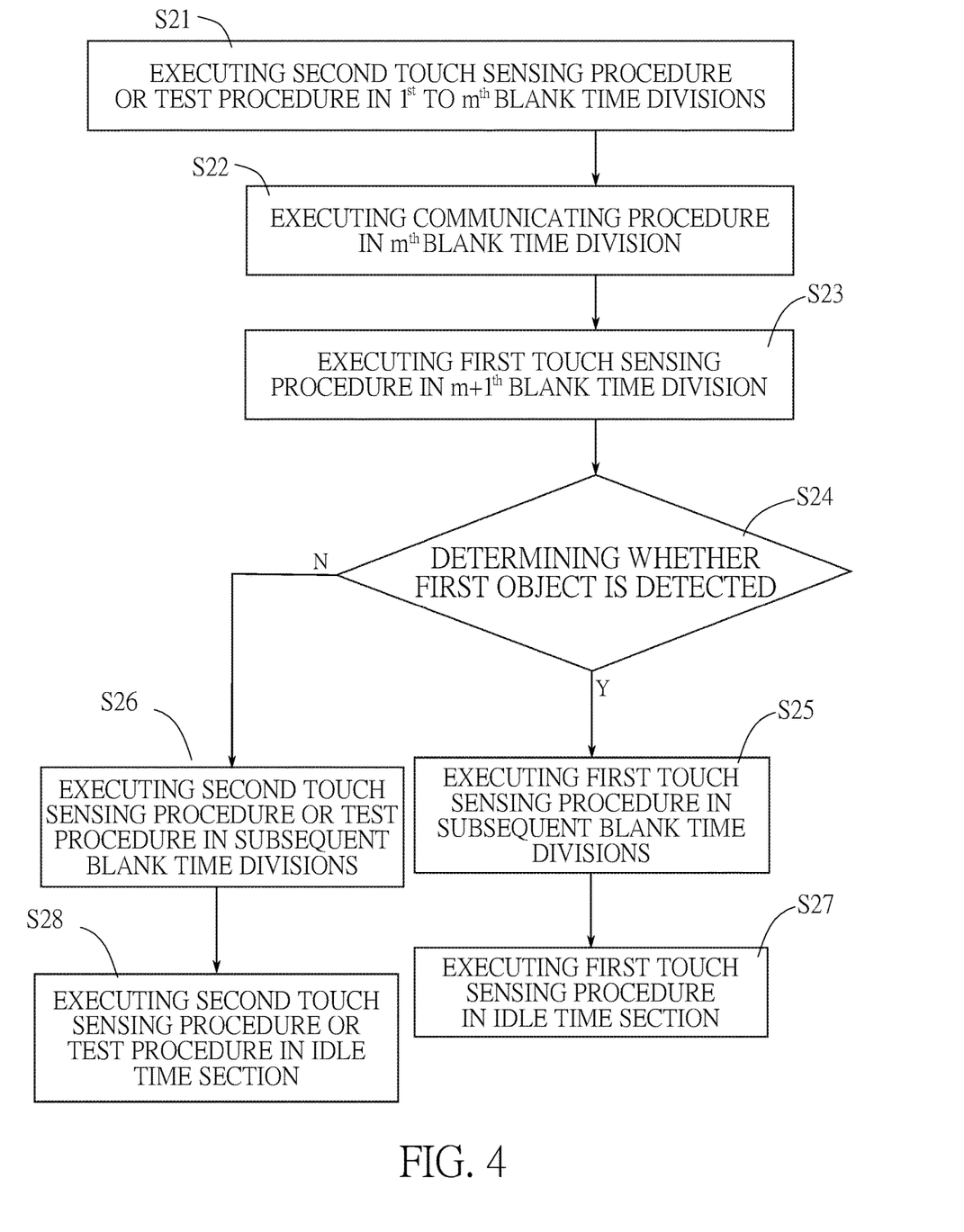
FIG. 4 is a flow chart of a second embodiment of a touch sensing method in accordance with the present invention.
Figure 5A:
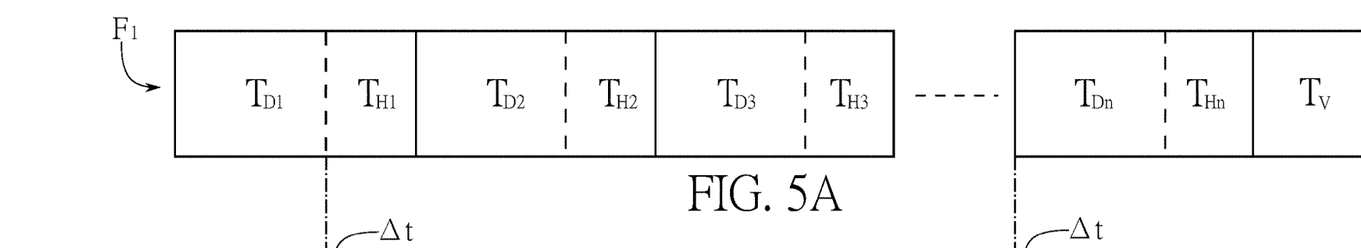
FIGS. 5A to 5D are time period charts of a second example as implementing a touch sensing method in accordance with the present invention.
Figure 5B:
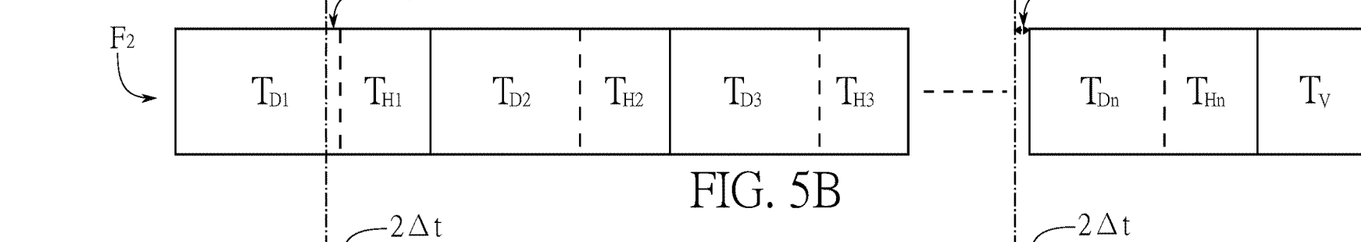
Figure 5C:
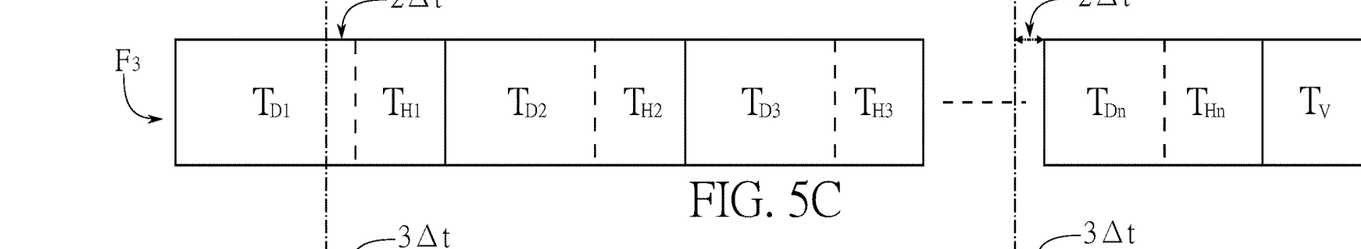
Figure 5D:
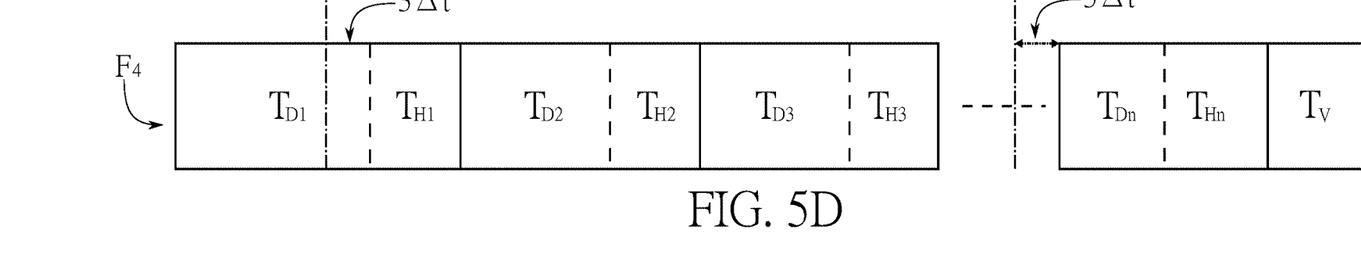

With reference to FIGS. 4 and 2, the second sensing procedure or the test procedure is executed in the $1^{st}$ to m−$1^{th}$ blank time division $T_{H1}$ ... $T_{Hm-1}$ (S21) to detect whether the second object touches the display panel 11 or noise is occurred. The communicating procedure is executed in the $m^{th}$ blank time division $T_{Hm}$ (S22). The first touch sensing procedure is executed in the m+$1^{th}$ blank time division $T_{Hm+1}$ (S23). In one embodiment, the step S22 is to execute the communicating procedure in the $m^{th}$ to $k^{th}$ blank time divisions $T_{Hm}$ ... $T_{Hk}$. In another embodiment, the step S23 is to execute the first touch sensing procedure in the m+$1^{th}$ to $g^{th}$ blank time divisions $T_{Hm+1}$ ... $T_{Hg}$. Based on the data retrieved in the first touch sensing procedure, whether the first object 20 is detected is determined (S24). When the first object 20 is detected, the first touch sensing procedure is executed continuously in the subsequent blank time divisions $T_{Hm+2}$ ... $T_{Hn}$ to keep receiving the downlink signal from the first object 20 (S25). When no first object 20 is detected, the second touch sensing procedure or the test procedure is executed in the subsequent blank time divisions $T_{Hm+2}$ ... $T_{Hn}$ (S26) to detect whether the second object touches the display panel 11 or noise is occurred.

Moreover, when the first object 20 is detected, the first touch sensing procedure is executed in the idle time section $T_V$ (S27). When no first object 20 is detected, the second sensing procedure or the test procedure is executed in the idle time section $T_V$ (S28). In another embodiment, even if the first object is detected, the uplink signal may include to request the first object 20 not to output the downlink signal in the idle time section $T_V$. Then in the idle time section $T_V$, the second sensing procedure or the test procedure is still executed.

In the aforementioned embodiment, using multiple blank time divisions to execute the communicating procedure allows the uplink signal to contain more data.

Thus, by executing the communicating procedure in the blank time divisions $T_{H1}$ ... $T_{Hn}$ of the executing time section $T_E$, the display with touch device 10 senses various touch objects in a time-multiplexed manner.

In addition, whether executing the communicating procedure, the first touch sensing procedure, the second touch sensing procedure or the test procedure in the blank time divisions $T_{H1}$ ... $T_{Hn}$, the gates of the corresponding thin film transistors need to be turned off. If the blank time divisions $T_{H1}$ ... $T_{Hn}$ are at corresponding time, the turned off gates of the thin film transistors are located at the same gate lines so that those turned off gates of the thin film transistors are easily fatigued. The fatigued thin film transistors may not be turned off completely to cause the afterimage on the display panel 11.

Figure 6A:
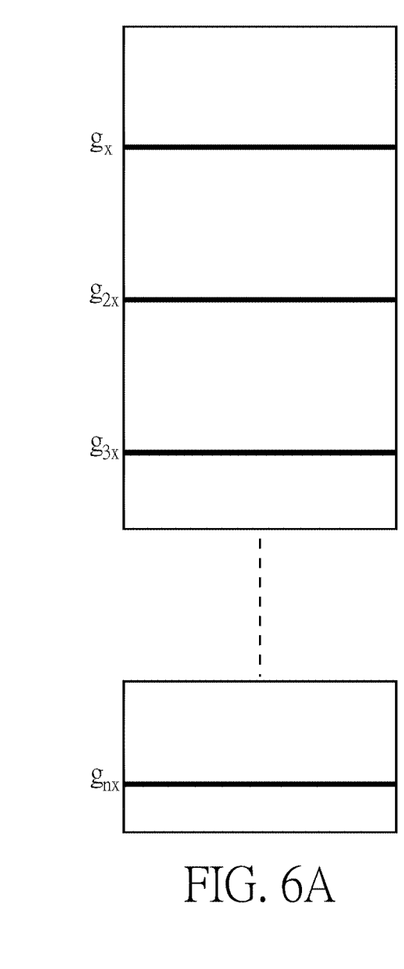
FIGS. 6A to 6D are operational illustrative view of a display when the example shown in FIGS. 5A to 5D is implemented.
Figure 6B:
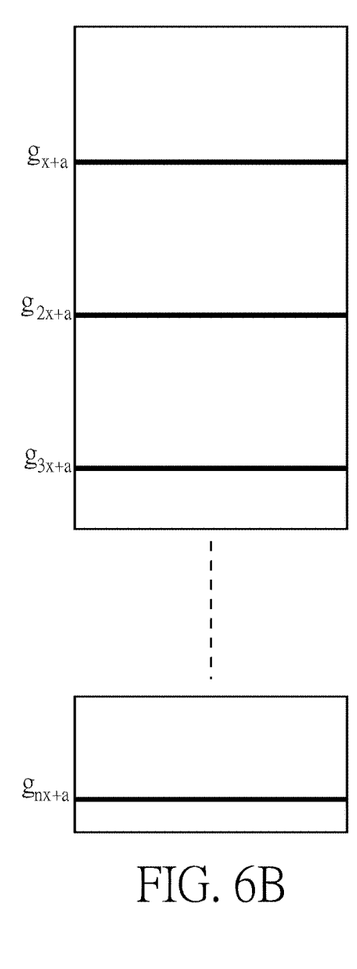
Figure 6C:
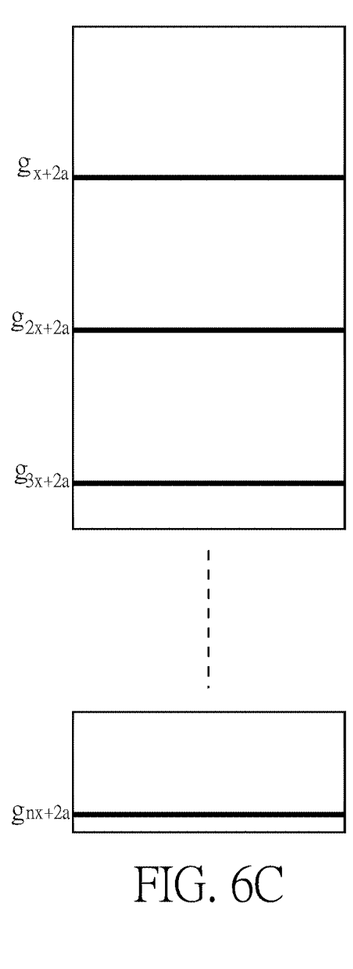
Figure 6D:
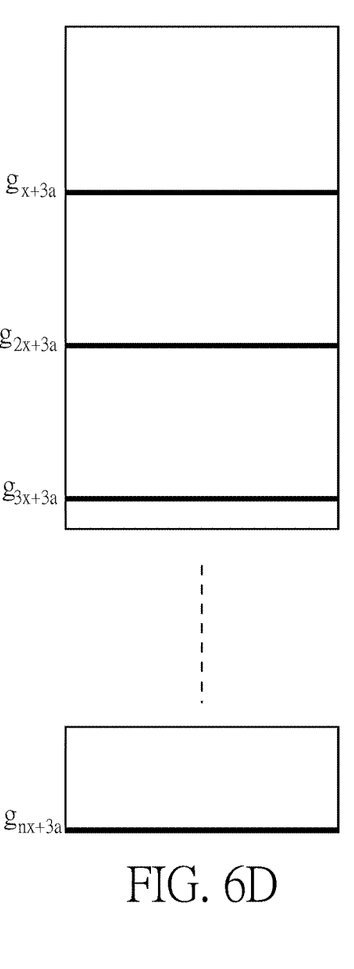
Figure 7A:
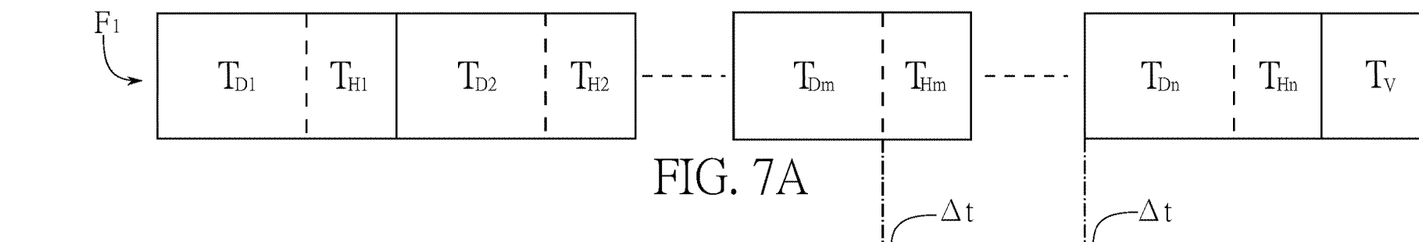
FIGS. 7A to 7D are time period charts of a third example as implementing a touch sensing method in accordance with the present invention.
Figure 7B:
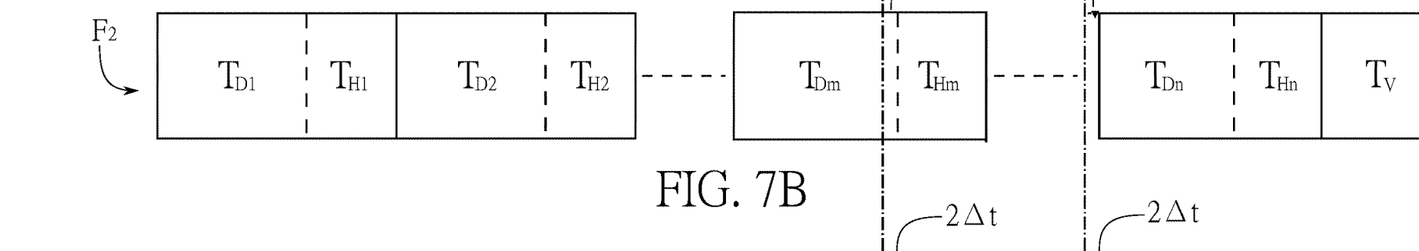
Figure 7C:
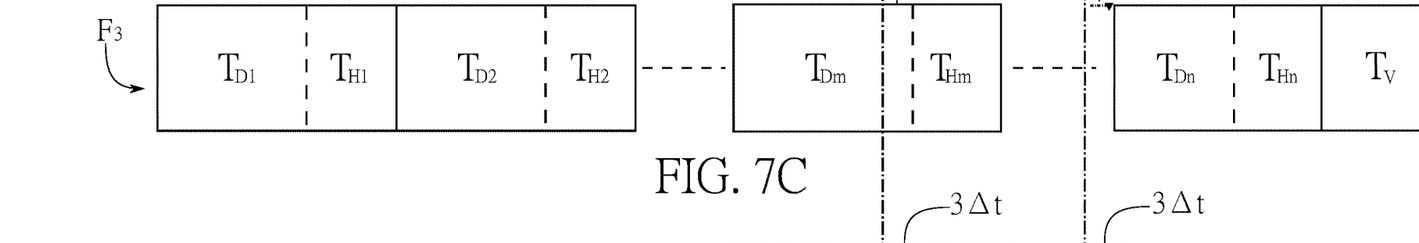
Figure 7D:
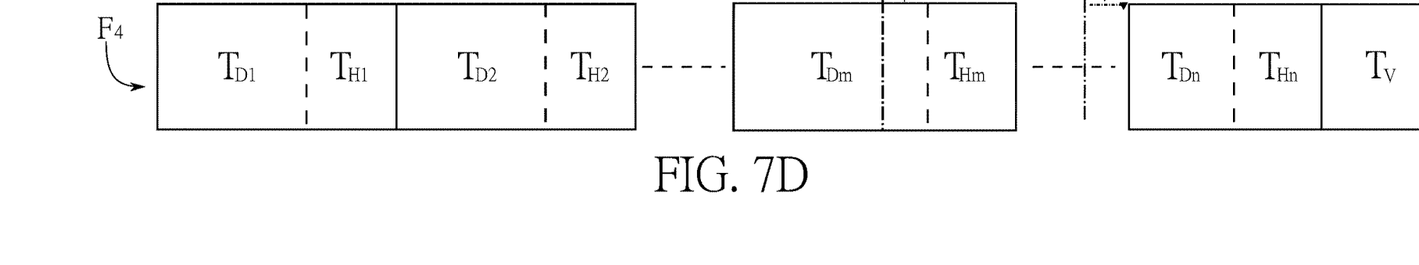

Therefore, with reference to FIGS. 5A to 5D, another embodiment of a touch sensing method in accordance with the present invention is recited to solve the fatigued thin film transistors problem and to achieve the advantages of the aforementioned embodiment. In each image display period $F_1$, $F_2$, $F_3$, $F_4$, the length of time of the $1^{st}$ display time division $T_{D1}$ and the length of time of the last display time division $T_{Dn}$ are added to be twice a first length of time. The length of time of each one of the rest display time divisions $T_{D2}$ ... $T_{Dn-1}$ is the first length of time. In the image display periods $F_1$, $F_2$, $F_3$, $F_4$, the time lengths of the $1^{st}$ display time division $T_{D1}$ are decreased or increased by an arithmetical series. For example, the $1^{st}$ display time division $T_{D1}$ of the $1^{st}$ image display period $F_1$ is μsec and the last display time division $T_{Dn}$ of the $1^{st}$ image display period $F_1$ is μsec. The $1^{st}$ display time division $T_{D1}$ of the $2^{nd}$ image display period $F_2$ is b+Δt μsec and the last display time division $T_{Dn}$ of the $2^{nd}$ image display period $F_2$ is b−Δt μsec. The $1^{st}$ display time division $T_{D1}$ of the $3^{rd}$ image display period $F_3$ is b+2Δt μsec and the last display time division $T_{Dn}$ of the $3^{rd}$ image display period $F_2$ is b−2Δt μsec. The $1^{st}$ display time division $T_{D1}$ of the $4^{th}$ image display period $F_4$ is b+3Δt μsec and the last display time division $T_{Dn}$ of the $4^{th}$ image display period $F_4$ is b−3 Δt μsec, and vice versa. The performance is shown in FIGS. 6A to 6D. FIG. 6A is the operational illustrative view corresponding to the time phase shown in FIG. 5A. The gates of the $x^{th}$, $2x^{th}$, $3x^{th}$, $nx^{th}$ thin film transistors $g_x$、 $g_{2x}$、$g_{3x}$ ... $g_{nx}$ are turned off. FIG. 6B is the operational illustrative view corresponding to the time phase shown in FIG. 5B. The gates of the x+$a^{th}$, 2x+$a^{th}$, 3x+$a^{th}$, nx+$a^{th}$ thin film transistors $g_{x+a}$、 $g_{2x+a}$、$g_{3x+a}$ ... $g_{nx+a}$ are turned off. FIG. 6C is the operational illustrative view corresponding to the time phase shown in FIG. 5C. The gates of the x+$2a^{th}$, 2x+$2a^{th}$, 3x+$2a^{th}$, nx+$2a^{th}$ thin film transistors $g_{x+2a}$、 $g_{2x+2a}$、$g_{3x+2a}$ ... $g_{nx+2a}$ are turned off. FIG. 6D is the operational illustrative view corresponding to the time phase shown in FIG. 5D. The gates of the x+$3a^{th}$, 2x+$3a^{th}$, 3x+$3a^{th}$, nx+$3a^{th}$ thin film transistors $g_{x+3a}$、 $g_{2x+3a}$、$g_{3x+3a}$ ... $g_{nx+3a}$ are turned off. Thus, in the different image display periods, the turned off gates of the thin film transistors are changed based on the change of the length of time of the $1^{st}$ display time division $T_{D1}$ and are not the same to avoid the afterimage showing on the display panel. In one embodiment, when the length of time of the $1^{st}$ display time division $T_{D1}$ is decreased by an arithmetical series, the decreased length of time is shifted before the last blank time division $T_{Hn}$ as a display time division $T_{Dn+1}$.

In the embodiment as shown in FIGS. 5A to 5D, the communicating procedure may be executed in the blank time division $T_{H1}$ after the $1^{st}$ display time division $T_{D1}$, or may be executed in the blank time divisions $T_{H1}$ ... $T_{Hi}$ after the $1^{st}$ to $i^{th}$ display time divisions $T_{D1}$ ... $T_{Di}$. Other procedures are executed as described in the aforementioned second embodiment. The uplink signal output in the communicating procedure may include the first length of time and the lengths of time of the blank time divisions. In one embodiment, the last blank time division $T_{Hn}$ may not exist between the display time division $T_{Dn}$ and the idle time section $T_V$.

Figure 8A:
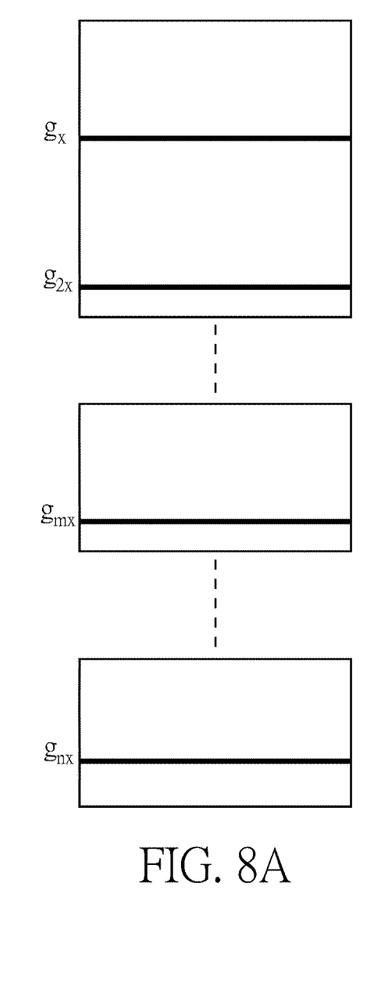
FIGS. 8A to 8D are operational illustrative view of a display when the example shown in FIGS. 7A to 7D is implemented.
Figure 8B:
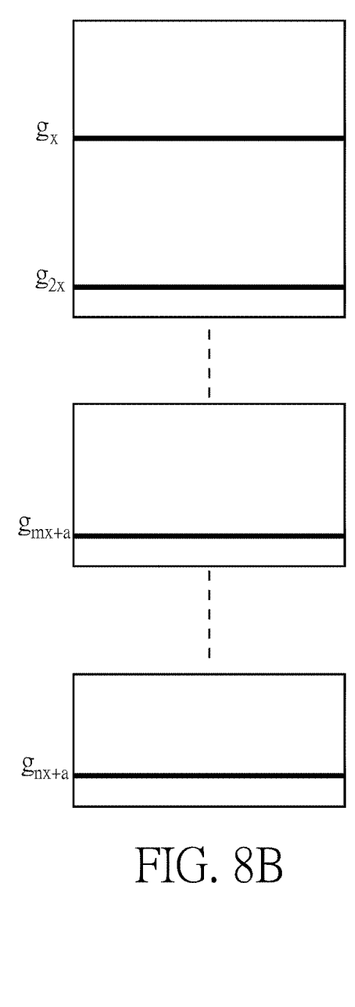
Figure 8C:
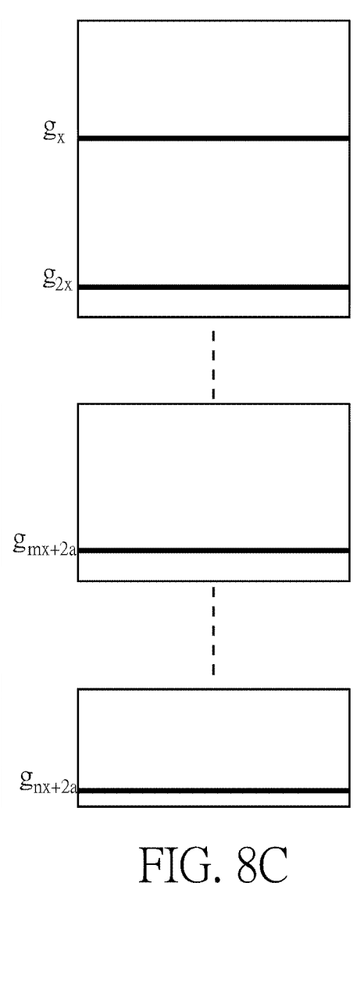
Figure 8D:
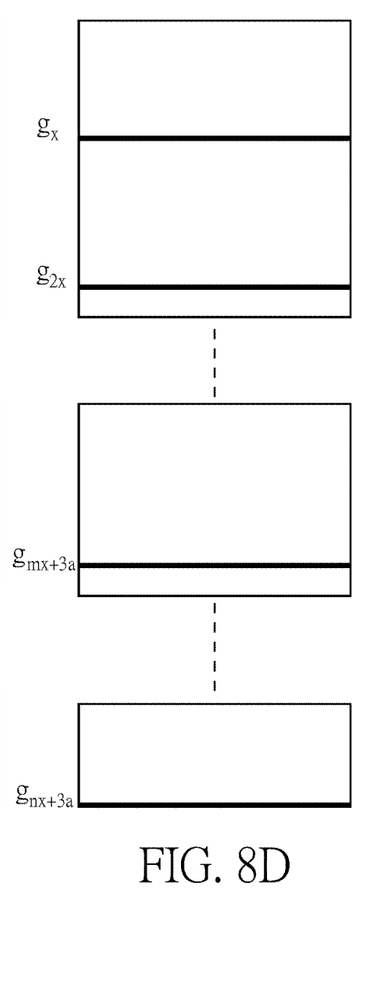
Figure 9A:
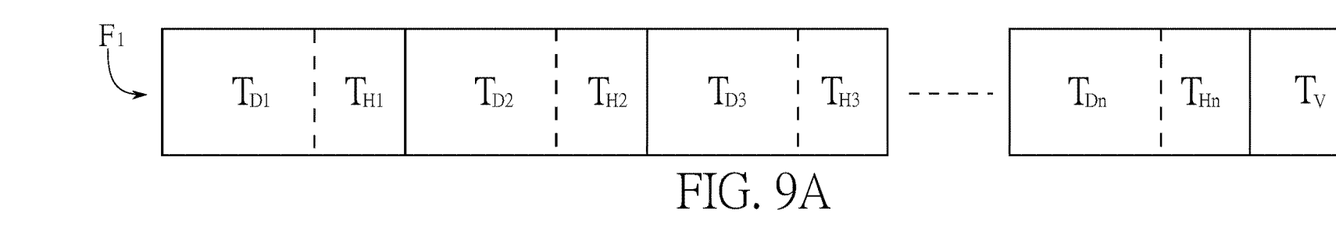
FIGS. 9A to 9D are time period charts of a fourth example as implementing a touch sensing method in accordance with the present invention.
Figure 9B:
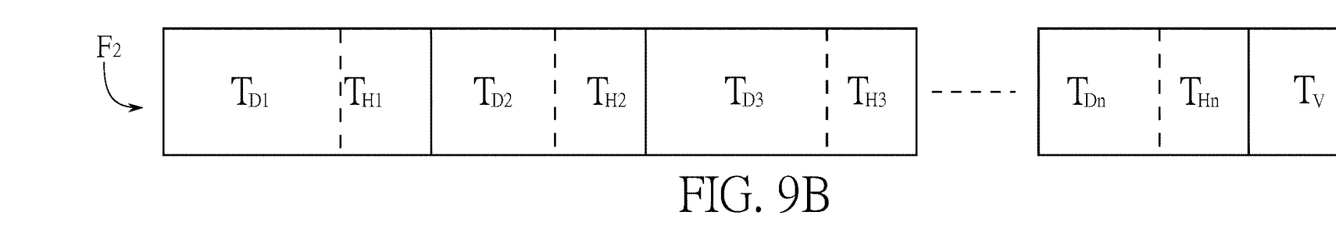
Figure 9C:
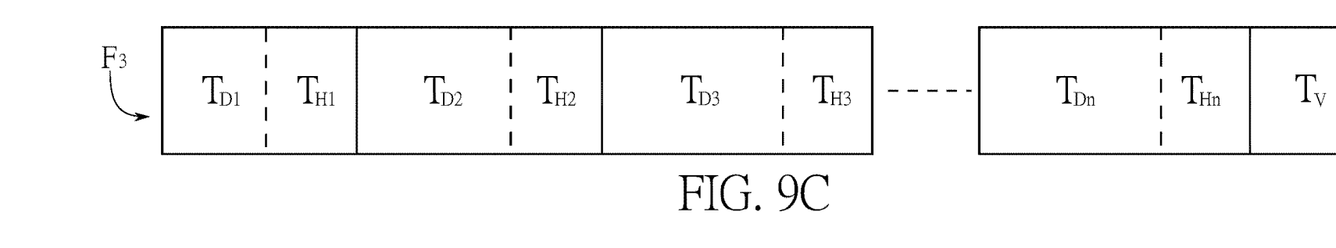
Figure 9D:
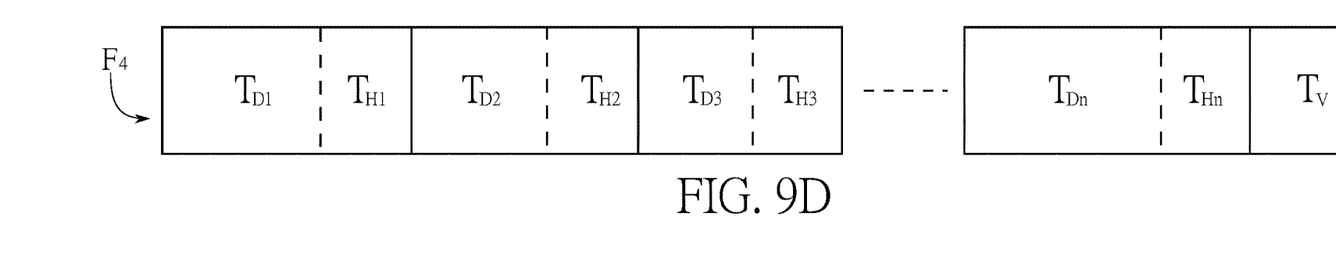

With reference to FIGS. 7A to 7D, in each image display period $F_1$, $F_2$, $F_3$, $F_4$, the length of time of the $m^{th}$ display time division $T_{Dm}$ and the length of time of the last display time division $T_{Dn}$ are added to be twice the first length of time, wherein $m^{th}$ may be $2^{rd}$ as shown in the figures. The length of time of each one of the rest display time divisions $T_{D1}$ ... $T_{Dn-1}$ is the first length of time. In the image display periods $F_1$, $F_2$, $F_3$, $F_4$, the time lengths of the $m^{th}$ display time division $T_{Dm}$ are decreased or increased by an arithmetical series. The performance is shown in FIGS. 8A to 8D. FIG. 8A is the operational illustrative view corresponding to the time phase shown in FIG. 7A. The gates of the $x^{th}$, $2x^{th}$, $3x^{th}$, $nx^{th}$ thin film transistors $g_x$、 $g_{2x}$、$g_{3x}$ ... $g_{nx}$ are turned off. FIG. 8B is the operational illustrative view corresponding to the time phase shown in FIG. 7B. The gates of the x+$a^{th}$, 2x+$a^{th}$, 3x+$a^{th}$, nx+$a^{th}$ thin film transistors $g_{x+a}$、 $g_{2x+a}$、$g_{3x+a}$ ... $g_{nx+a}$ are turned off. FIG. 8C is the operational illustrative view corresponding to the time phase shown in FIG. 7C. The gates of the x+$2a^{th}$, 2x+$2a^{th}$, 3x+$2a^{th}$, nx+$2a^{th}$ thin film transistors $g_{x+2a}$、 $g_{2x+2a}$、$g_{3x+2a}$ ... $g_{nx+2a}$ are turned off. FIG. 8D is the operational illustrative view corresponding to the time phase shown in FIG. 7D. The gates of the x+$3a^{th}$, 2x+$3a^{th}$, 3x+$3a^{th}$, nx+$3a^{th}$ thin film transistors $g_{x+3a}$、$g_{2x+3a}$、$g_{3x+3a}$ ... $g_{nx+3a}$ are turned off. Thus, in the different image display periods, the turned off gates of the thin film transistors are changed based on the change of the length of time of the $m^{th}$ display time division $T_{Dm}$ and are not the same to avoid the afterimage showing on the display panel.

In the embodiment as shown in FIGS. 7A to 7D, the communicating procedure may be executed in the blank time division $T_{Hm}$ after the $m^{th}$ display time division $T_{Dm}$, or may be executed in the blank time divisions $T_{Hm}$ ... $T_{Hi}$ after the $m^{th}$ to $i^{th}$ display time divisions $T_{Dm}$ ... $T_{Di}$. Other procedures are executed as described in the aforementioned third embodiment. The uplink signal output in the communicating procedure may include the first length of time and the lengths of time of the blank time divisions.

Figure 10A:
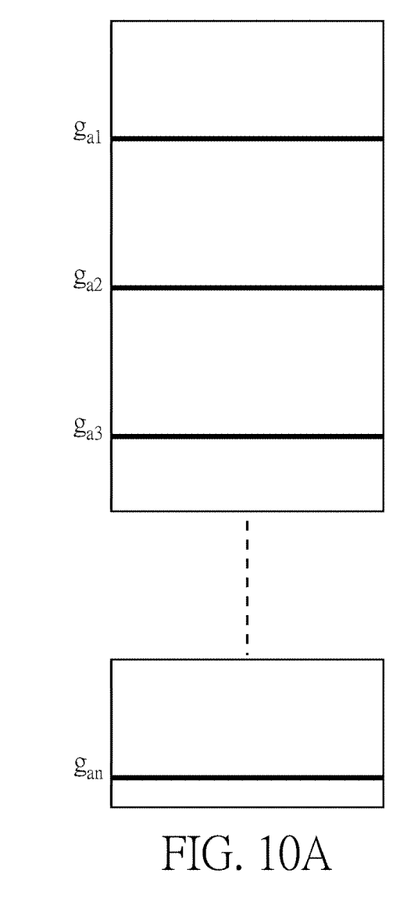
FIGS. 10A to 10D are operational illustrative view of a display when the example shown in FIGS. 9A to 9D is implemented.
Figure 10B:
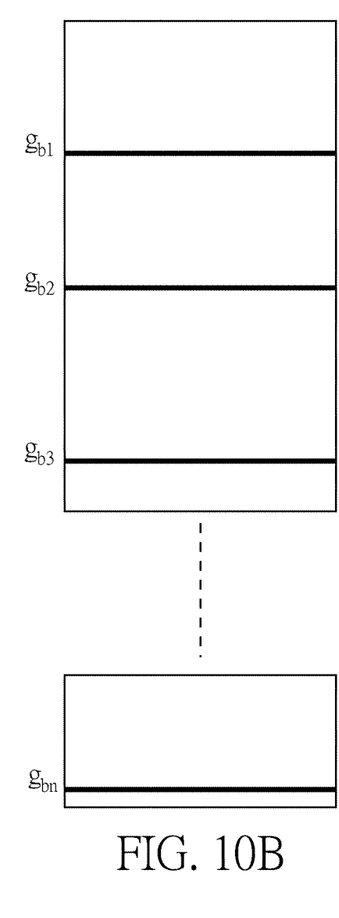
Figure 10C:
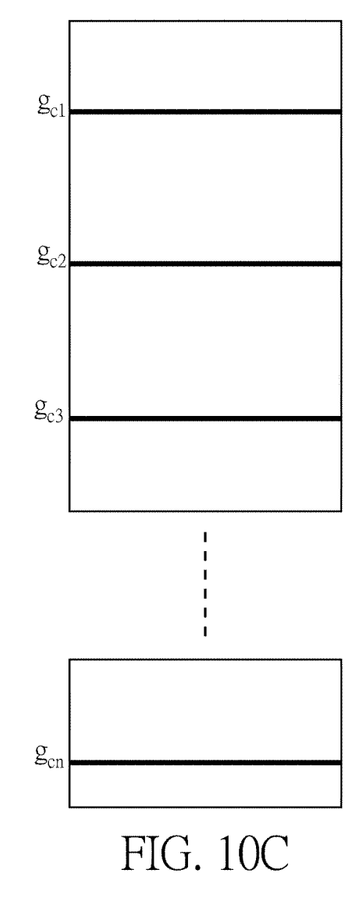
Figure 10D:
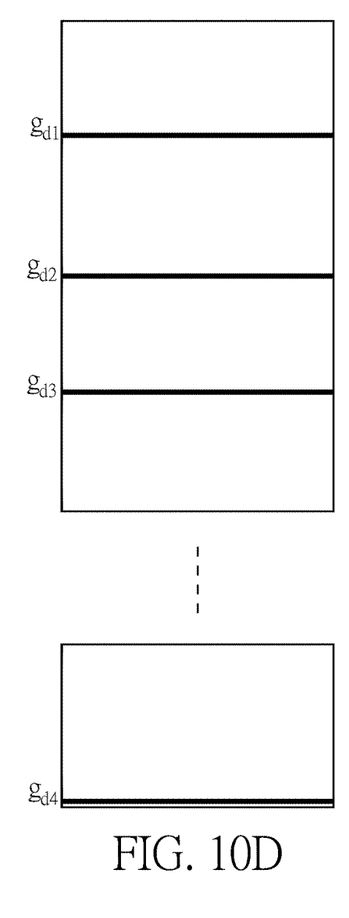

With reference to FIGS. 9A to 9D, in each image display period $F_1$, $F_2$, $F_3$, $F_4$, the lengths of time of the display time divisions $T_{D1}$ ... $T_{Dn}$ are different. For example, the length of time of the first display time division $T_{D1}$ in the first image display period $F_1$ is different with the length of time of the second display time division $T_{D2}$ in the first image display period $F_1$. In the image display periods $F_1$, $F_2$, $F_3$, $F_4$, the time lengths of the display time division $T_{D1}$ ... $T_{Dn}$ of the same order are also different. For example, the length of time of the first display time division $T_{D1}$ in the first image display period $F_1$ is different with the length of time of the first display time division $T_{D1}$ in the second image display period $F_2$. The performance is shown in FIGS. 10A to 10D. FIG. 10A is the operational illustrative view corresponding to the time phase shown in FIG. 9A. The gates of the $a1^{th}$, $a2^{th}$, $a3^{th}$, $an^{th}$ thin film transistors $g_{a1}$、$g_{a2}$、$g_{a3}$ ... $g_{an}$ are turned off. FIG. 10B is the operational illustrative view corresponding to the time phase shown in FIG. 9B. The gates of the $b1^{th}$, $b2^{th}$, $b3^{th}$, $bn^{th}$ thin film transistors $g_{b1}$、$g_{b2}$、$g_{b3}$ ... $g_{bn}$ are turned off. FIG. 10C is the operational illustrative view corresponding to the time phase shown in FIG. 9C. The gates of the $c1^{th}$, $c2^{th}$, $c3^{th}$, $cn^{th}$ thin film transistors $g_{c1}$、$g_{c2}$、$g_{c3}$ ... $g_{cn}$ are turned off. FIG. 10D is the operational illustrative view corresponding to the time phase shown in FIG. 9D. The gates of the $d1^{th}$, $d2^{th}$, $d3^{th}$, $dn^{th}$ thin film transistors $g_{d1}$、$g_{d2}$、$g_{d3}$ ... $g_{dn}$ are turned off. Thus, in the different image display periods, the turned off gates of the thin film transistors are changed based on the change of the length of time of the display time divisions $T_{D1}$ ... $T_{Dn}$ and are not the same to avoid the afterimage showing on the display panel.

In the embodiment as shown in FIGS. 9A to 9D, the communicating procedure may be executed in anyone of the blank time division $T_{H1}$ ... $T_{Hn}$. Other procedures are executed as described in the aforementioned first, second and third embodiments. The lengths of time of each display time division and each blank time division may be pre-stored in the data sheets in the display with touch device 10 and the first object 20. The uplink signal output in the communicating procedure may include a selection information of one of said data sheets.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A touch sensing method for a display with touch device having multiple common electrodes and an image display period including an executing time section, wherein the executing time section includes a plurality of actuating time segments, each of the actuating time segments comprises a display time division and a blank time division, and the actuating time segments comprise at least one first actuating time segment and multiple second actuating time segments, wherein a sum of time lengths of the display time divisions of one of the at least one first actuating time segment and the last one of the second actuating time segments in one image display period is equal to twice a first length of time, while the time length of the display time division of each one of the rest of the second actuating time segments in the same image display period is the first length of time, and the time lengths of the display time divisions of the first actuating time segments of adjacent image display periods are different, and the method comprising a step of:
executing a communicating procedure in the blank time division of the at least one first actuating time segment, wherein the common electrodes output an uplink signal in the communicating procedure.

2. The touch sensing method as claimed in claim 1, wherein the image display period further includes an idle time section and the method further comprises step of:
executing a first touch sensing procedure, a second touch sensing procedure or a test procedure in the idle time section, wherein the first touch sensing procedure comprises a step of detecting the first object through the common electrodes, the second touch sensing procedure comprises a step of detecting a second object through the common electrodes, and the test procedure comprises a step of detecting noise through the common electrodes.

3. The touch sensing method as claimed in claim 2, wherein the first touch sensing procedure further comprises steps of receiving a signal output from the first object through the common electrodes, and measuring capacitance changes of the receiving common electrodes to determine whether the first object is detected or obtain a touch information of the first object.

4. The touch sensing method as claimed in claim 3, wherein when the communicating procedure is executed and then the first object is detected while executing the first touch sensing procedure in the blank time division in at least one subsequent second actuating time segment, the first touch sensing procedure is then executed in the blank time divisions in rest of the subsequent second actuating time segments of the image display period.

5. The touch sensing method as claimed in claim 2, wherein the second touch sensing procedure further comprises steps of providing a driving signal to the common electrodes for touch sensing and measuring capacitance changes of the driven common electrodes to determine whether a second object is detected.

6. The touch sensing method as claimed in claim 5, wherein when the communicating procedure is executed and then the first object is not detected while executing the first touch sensing procedure in the blank time division in at least one subsequent second actuating time segment, the second touch sensing procedure is then executed in the blank time divisions in rest of the subsequent second actuating time segments of the image display period.

7. The touch sensing method as claimed in claim 2, wherein when the communicating procedure is executed and then the first object is not detected while executing the first touch sensing procedure in the blank time division in at least one subsequent second actuating time segment, the second touch sensing procedure or the test procedure is then executed in the subsequent idle time section of the image display period.

8. The touch sensing method as claimed in claim 2, wherein in the image display period, the actuating time sections proceed first and then the idle time section proceeds.

9. The touch sensing method as claimed in claim 1, wherein the first touch sensing procedure further comprises steps of receiving a signal output from the first object through the common electrodes, and measuring capacitance changes of the receiving common electrodes to determine whether the first object is detected or obtain a touch information of the first object.

10. The touch sensing method as claimed in claim 9, wherein when the communicating procedure is executed and then the first object is detected while executing the first touch sensing procedure in the blank time division in at least one subsequent second actuating time segment, the first touch sensing procedure is then executed in the blank time divisions in rest of the subsequent second actuating time segments of the image display period.

11. The touch sensing method as claimed in claim 1, wherein the second touch sensing procedure further comprises steps of providing a driving signal to the common electrodes for touch sensing and measuring capacitance changes of the driven common electrodes to determine whether a second object is detected.

12. The touch sensing method as claimed in claim 11, wherein when the communicating procedure is executed and then the first object is not detected while executing the first touch sensing procedure in the blank time division in at least one subsequent second actuating time segment, the second touch sensing procedure is then executed in the blank time divisions in rest of the subsequent second actuating time segments of the image display period.

13. The touch sensing method as claimed in claim 1, wherein when the communicating procedure is executed and then the first object is not detected while executing the first touch sensing procedure in the blank time division in at least one subsequent second actuating time segment, the second touch sensing procedure is then executed in the blank time divisions in rest of the subsequent second actuating time segments of the image display period.

14. The touch sensing method as claimed in claim 1, wherein in the image display period, the at least one first actuating time segment proceeds first and then the second actuating time segments proceed.

15. The touch sensing method as claimed in claim 1, wherein the uplink signal includes first lengths of time and lengths of time of the blank time divisions of the first actuating time segment and of the second actuating time segments.

16. The touch sensing method as claimed in claim 1, wherein lengths of time of the display time division of the first actuating time segment and of the second actuating time segments in one image display period are different.

17. The touch sensing method as claimed in claim 16, wherein
 the lengths of time of the display time division having the same order of the adjacent image display periods are different; and
 the first actuating time segment are proceeded at $m^{th}$ order in the image display period, wherein m is an integer.

18. The touch sensing method as claimed in claim 17, wherein
 the lengths of time of the display division and the blank time division of the first actuating segment, and the lengths of time of the display divisions and the blank time divisions of the multiple second actuating segments are pre-stored in multiple data sheets; and
 the uplink signal includes a selection information of said data sheets to provide the lengths of time of the subsequent first actuating segment and second actuating segments.

19. The touch sensing method as claimed in claim 16, wherein
 the lengths of time of the display division and the blank time division of the first actuating segment, and the lengths of time of the display divisions and the blank time divisions of the multiple second actuating segments are pre-stored in multiple data sheets; and
 the uplink signal includes a selection information of said data sheets to provide the lengths of time of the subsequent first actuating segment and second actuating segments.

20. The touch sensing method as claimed in claim 1 further comprising step of:
 executing a first touch sensing procedure or a second touch sensing procedure in the blank time division of each of the second actuating time segments, wherein the first touch sensing procedure comprises a step of detecting the first object through the common electrodes and the second touch sensing procedure comprises a step of detecting a second object through the common electrodes.

\* \* \* \* \*